United States Patent
Fruechtenicht

(10) Patent No.: US 9,601,897 B2
(45) Date of Patent: Mar. 21, 2017

(54) OPTICAL ROTATING DEVICE FOR INJECTING A LASER BEAM AND METHOD FOR POSITIONING A LASER BEAM

(71) Applicant: UNIVERSITAET STUTTGART, Stuttgart (DE)

(72) Inventor: Johannes Fruechtenicht, Stuttgart (DE)

(73) Assignee: Universitaet Stuttgart, Stuttgart (DE)

(*) Notice: Subject to any disclaimer, the term of this patent is extended or adjusted under 35 U.S.C. 154(b) by 0 days.

(21) Appl. No.: 14/759,728

(22) PCT Filed: Jan. 9, 2013

(86) PCT No.: PCT/EP2013/000040
§ 371 (c)(1),
(2) Date: Sep. 1, 2015

(87) PCT Pub. No.: WO2014/108139
PCT Pub. Date: Jul. 17, 2014

(65) Prior Publication Data
US 2015/0380891 A1    Dec. 31, 2015

(51) Int. Cl.
| | |
|---|---|
| *H01S 3/101* | (2006.01) |
| *B23K 26/06* | (2014.01) |
| *B23K 26/067* | (2006.01) |
| *G02B 27/09* | (2006.01) |
| *G02B 27/14* | (2006.01) |
| *G02B 27/48* | (2006.01) |
| *G02F 1/03* | (2006.01) |
| *G02F 1/09* | (2006.01) |
| *H01S 3/00* | (2006.01) |

(52) U.S. Cl.
CPC ......... *H01S 3/101* (2013.01); *B23K 26/0604* (2013.01); *B23K 26/0676* (2013.01); *G02B 27/09* (2013.01); *G02B 27/144* (2013.01); *G02B 27/48* (2013.01); *G02F 1/0311* (2013.01); *G02F 1/093* (2013.01); *H01S 3/0064* (2013.01); *H01S 3/0085* (2013.01)

(58) Field of Classification Search
USPC .................................................. 359/257–275
See application file for complete search history.

(56) References Cited

U.S. PATENT DOCUMENTS

| | | | | |
|---|---|---|---|---|
| 4,316,074 A | * | 2/1982 | Daly .................... | B23K 26/067 |
| | | | | 219/121.6 |
| 2005/0107773 A1 | * | 5/2005 | Bergt .................... | B23K 26/08 |
| | | | | 606/4 |
| 2009/0219378 A1 | * | 9/2009 | Nakamura ............... | G02F 1/03 |
| | | | | 347/255 |

FOREIGN PATENT DOCUMENTS

| | | |
|---|---|---|
| DE | 43 41 553 C1 | 4/1995 |
| JP | 2002-96187 A | 4/2002 |
| JP | 2002-176006 A | 6/2002 |

OTHER PUBLICATIONS

International Search Report with English translation for International Application No. PCT/EP2013/000040, mailed Dec. 2, 2013, 5 pages.

* cited by examiner

*Primary Examiner* — Mohammed Hasan
(74) *Attorney, Agent, or Firm* — Brake Hughes Bellermann LLP

(57) ABSTRACT

An optical rotating device for injecting a laser beam may include deflection devices between which the injected laser beam may rotate in the optical rotating device, and an extraction device that may extract the laser beam after carrying out a predetermined number of rotations in the rotating device. The deflection devices may be arranged such that the position of the laser beam during extraction is dependent on the number of rotations carried out in the optical rotating device.

16 Claims, 1 Drawing Sheet

OPTICAL ROTATING DEVICE FOR INJECTING A LASER BEAM AND METHOD FOR POSITIONING A LASER BEAM

BACKGROUND

The invention concerns an optical circulation device for coupling in a laser beam, and a method of positioning a laser beam.

In industry, pulsed lasers are used more and more. In order to achieve higher productivities, it is tried to increase the volume of material per unit of time that is to be treated by laser beams. This is accomplished by a scaling of power of laser systems. Laser machining processes are usually carried out in a certain pulse energy range. For this reason, increasing average power in general requires increasing pulse repetition rate in order to maintain the pulse energy within the desired range.

Pulsed laser radiation for material machining may be generated for example in the following ways: Q-switched resonators, oscillators, and (regenerative) amplifiers. For short-pulse lasers having a pulse duration of less than a nanosecond, which are required for cold ablation, Q-switched resonators are not suitable for the reason that pulse formation is too slow. Oscillators so far do not achieve sufficiently high pulse energies for broad fields of application, for which reason pulses are boosted using linear or regenerative amplifiers, decreasing the repetition rate. Due to technological progress, the average powers that can be achieved with oscillators are rising continuously. Oscillators suited for industrial application for reasons of stability can have only short resonator lengths and therefore emit their power in pulses of high repetition rate, typically several megahertz, and comparatively low pulse energy.

In material processing, there now arises the problem that the pulses have to be separated individually, which has to be done sufficiently fast in between the individual laser pulses, in order to impinge upon a workpiece in different positions. Typically, in material processing using lasers, different positions of the workpiece are to be treated successively with the laser. One exemplary application is for example edge isolation of solar cells, where a line of individual laser pulses overlapping in a defined way is drawn along the workpiece. Also in numerous other applications, for example marking or surface treatment, the pulsed laser beam is moved relative to the surface of the workpiece. In order to generate this relative movement of the laser pulse beam relative to the workpiece, one can either change the position of the workpiece, which is a slower alternative, or scan the laser across the fixed or slowly moving workpiece, as a faster alternative.

Known laser scanner systems use moving optics, such as mirrors, where the maximum positive and negative acceleration thereof for positioning a laser beam imposes limits in speed for the system. Rotating prisms, glass bodies, and so on operate with a constant velocity respectively angular velocity, however, their positioning speed is limited in mechanical regards and due to stability reasons so that they cannot be used for the high repetition rates described above.

A further application of pulsed lasers in micro material machining is for example drilling tiny holes. For helical drilling, an optics having optical components rotating at very high speeds is used to position individual laser pulses. The beam positioning speed is limited by mechanical factors and for reasons of stability.

The invention is based on the object of providing a device respectively a method that allows for a very fast beam positioning of laser beams, in particular pulsed laser beams.

SUMMARY

This object is solved by the subject-matter of the independent claims.

One aspect of the invention concerns an optical circulation device for coupling in a laser beam, comprising deflection devices between which the coupled-in laser beam circulates within the optical circulation device, and comprising an out-coupling device for coupling out the laser beam after having carried out a predetermined number of circulations respectively turns in the circulation device. Thereby, the deflection devices are arranged and designed such that the position of the laser beam when coupling out depends on the number of circulations or turns carried out in the optical circulation device.

The optical circulation device may exhibit a resonator-like construction, similar to a laser resonator. The optical circulation device is arranged subsequent to a conventional laser system, and a laser beam generated in a conventional laser system can be coupled into this external optical arrangement of the circulation device. The structure of the optical circulation device resembles a resonator, at least in the regard that the coupled-in laser beam can circulate the circulation device per circulation or turn on an almost identical path in an optical arrangement. As an illustrative example, this may take place in an arrangement resembling a ring resonator, which the laser beam traverses several times. Here, the deflection devices serve the purpose of guiding the laser beam in the circulation device. As deflection devices, there may be provided for example mirrors, reflectors, prisms or similar. After the laser beam has carried out a predetermined number of circulations or turns in the circulation device, the laser beam is coupled out of the circulation device. The position of the laser beam, when it is coupled out, depends on the number of circulations that have been carried in the circulation device. For example, the beam position may be offset by a predetermined distance in a predetermined direction after each single circulation, so that the beam position is offset the more in this one predetermined direction, the greater the number of circulations is that the laser beam has carried out in the circulation device.

The expression that the deflection devices are designed and arranged in such a way that the laser beam is guided in a specific way is to be understood such that the deflection devices (that is, for example mirrors, etc.) are adjusted such that the laser beam coupled into the circulation device experiences a very specific guidance, that is, is guided accordingly. When compared with a regular laser resonator, in which the laser beam to be established always is passing on exactly the same path, the optical circulation device is designed such that the laser beam experiences a slight spatial offset with each circulation. When compared with a conventional laser resonator, the deflection devices of the circulation device are so to say slightly "misadjusted". However, in case of the optical circulation device, this "misadjustment" is intentionally and deliberately calibrated such that a coupled-in laser beam in the circulation device experiences a slight change of its beam position with each circulation.

Coupling the laser beam into the optical circulation device does not require a special mechanism, as the beam position, when coupling in the laser beam, is separated geometrically from the other beam paths after at least one circulation in the optical circulation device. Thus, coupling in may be performed for example with a so-called scraper mirror, that is, a mirror having a hole.

Once coupled in, the laser beam passes through the optical assembly of the circulation device. While doing so, it may pass arbitrary optical components arranged in the optical circulation device.

The position of the laser beam when coupling out may refer to the geometric, that is, spatial position of the laser beam. The position of the laser beam concerns both, the exact space coordinates in the geometric space and the directional vector of the direction of propagation of the laser beam when coupling out. In particular, the laser beam may be a laser pulse, so that several successive laser pulses may be separated spatially from each other by means of the circulation device.

Hence, the optical circulation device separates the different laser pulses no longer by spatially tilting guiding mirrors, as is known in the state of the art, but by means of a different number of circulations in the circulation device. As the circulation in the optical circulation device takes place at the speed of light, successive laser pulses may be separated spatially from each other much faster than this would be possible by differently tilting a deflecting mirror. In this way, the optical circulation device allows for an ultrafast spatial separation of successive laser pulses, for example a spatial separation of laser pulses that are provided with a repetition rate of several megahertz.

Here, it is sufficient if the optical circulation device initially separates the individual laser pulses from each other by a very small spatial distance, for example in the range of millimeters. It is possible to provide a larger spatial separation of the laser beams in form of optics subsequent to the circulation device in order for the laser beams, which are initially positioned only minimally different from each other, to be afterwards guided to and to be used for material processing.

Such a conventional slow beam positioning concept may be used for example for a macro positioning.

According to one embodiment, the deflection devices are designed and arranged in such a way that, when coupling out the laser beam, at least three different laser beam positions depend on three different numbers of circulations carried out in the optical circulation device. For example, coupling out may take place after one, two or three turns, in order to resolve three different beam positions from each other. Just as well, coupling out could take place after ten, twenty or thirty circulations in order to separate from each other the at least three different beam positions. Preferably, three to ten different positions of the laser beam can be separated from each other when coupling out after the laser beam has made three to ten different numbers of circulations in the optical circulation device.

The greater the number of beam positions that can be separated from each other by the optical circulation device, the greater is the number of positions of the workpiece onto which the laser beam can be directed for material processing.

According to an embodiment, the deflection devices are designed and arranged in such a way that a lateral offset of the position of the laser beam when coupling out depends on the number of circulations that are carried out in the circulation device. For example, the laser beam may experience a lateral offset by a predetermined distance with each circulation, that is, with each circulation, it may be further offset in this direction by one more distance length.

Here, the deflection device could be designed and arranged in particular in such a way that the lateral offset is in two dimensions, that is, that the position of the laser beam experiences a lateral offset in two spatial directions, either consecutively or simultaneously. Thus, with each circulation in the optical circulation device, the beam position is displaced laterally not only in one direction, but in two directions. The offset in the two spatial directions may be of different amount.

According to an embodiment, the deflection devices are designed and arranged in such a way that an angle of emission of the laser beam when coupling out depends on the number of circulations carried out in the optical circulation device. In this embodiment, the laser beam experiences an angular deflection with regard to its direction of propagation with each turn in the circulation device.

According to an embodiment, the deflection devices are designed and arranged in such a way that a circular path offset of the laser beam when coupling out depends on the number of circulations carried out in the optical circulation device. This embodiment can be used for example for an ultrafast helical drilling method.

According to an embodiment, the out-coupling device comprises a Pockels cell. A Pockels cell is an electro-optical switch that is typically based on the Pockels effect, an electro-optical effect. When an electrical field is applied to such a Pockels cell, it exhibits different refractive indexes (birefringence) for the electrical field components of the radiation passing through it. By means of controlling a Pockels cell, it is therefore possible to influence respectively adjust the polarization of the light passing through it, in particular allowing to switch the direction of polarization of linearly polarized light. Pockels cells regularly comprise a birefringent crystal. A Pockels cell in the sense of the present application can be based on a linear or a non-linear electro-optical effect. Pockels cells can be switched electrically at high speed, so that for coupling out for example the polarization of the laser beam in the circulating device may be changed such that the laser beam is coupled out at a polarization beam splitter after a predetermined number of circulations in the circulation device. Such a Pockels cell can be switched so fast that also laser pulses having very high repetition rates can be separated from each other.

Here, the Pockels cell can be arranged in such a way that each circulation of the laser beam in the circulation device passes through the Pockels cell. Hence, a single Pockels cell is sufficient for coupling out laser beams after a different number of circulations carried out in the circulation device.

According to an embodiment, the deflection devices are designed and arranged in such a way that the laser beam circulates in the circulation device on a spirally shaped path. The deflection device can for example guide the laser beam in a triangular or quadrangular spiral path. With each circulation, the laser beam is diverging or converging on its spiral path, so that after each circulation in the circulation device, a spatial offset of the position of the laser beam is obtained.

One aspect of the invention is concerned with a method for positioning a laser beam comprising the steps:
  coupling in a laser beam into an optical circulation device,
  carrying out a predetermined number of circulations of the laser beam in the optical circulation device, and
  coupling out the laser beam from the circulation device, such that the position of the laser beam when coupling out depends on the number of circulations carried out in the optical circulation device.

This method can be performed for example with an optical circulation device according to the aspect of the invention described in the above.

In the below, the invention is described by means of embodiments shown in the drawings.

DETAILED DESCRIPTION

Figure 1:
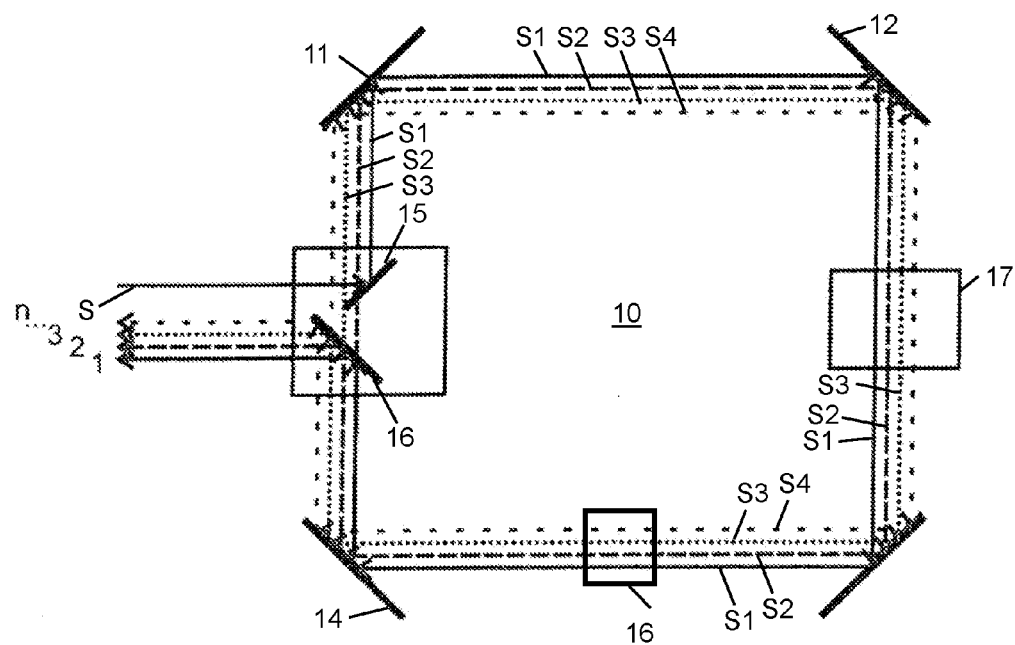
FIG. 1 is a schematic diagram of an optical deflection device which is similar to a ring resonator.

FIG. 1 shows in a schematic diagram an optical circulation device 10 as an optical arrangement that is realized external to a laser resonator as an independent component. The optical circulation device 10 is arranged with a substantially quadrangle arrangement that can be traversed by a laser beam. The quadrangle arrangement can be arranged for example horizontally, and comprises four deflection devices 11, 12, 13, and 14 at the four circulation corners thereof, which may be realized as deflecting mirrors or as deflecting prisms.

A laser beam that is coupled into the optical circulation device 10 circulates in the quadrangular arrangement until it is again coupled out of the circulation device. The laser beam is deflected by the deflection devices 11, 12, 13, and 14 so that it stays within the circulation device 10.

The optical circulation device 10 comprises an in-coupling mechanism 15 for coupling in the laser beam S. The optical circulation device 10 comprises an out-coupling mechanism 16 for coupling out the laser beam. The in-coupling mechanism 15 and the out-coupling mechanism 16 may be realized as a single component, or as multiple components, for example as a Pockels cell with thin-layer polarizer(s), as an acousto-optical modulator (AOM), and/or as moving optics.

Furthermore, one or more further optical components 17, such as lenses, etc., may be arranged in the beam path of the circulation device 10. In particular, a polarization switch 16' is arranged in the beam path of the circulation device 10, which can change the polarization of radiation circulating in the circulation device so that the radiation is coupled out at the out-coupling mechanism 16.

Here, the out-coupling mechanism 16 may be realized as a polarization beam splitter, which allows laser light of a predetermined polarization (for example p-polarization) passing through and thus leaves it within the circulation device 10, and which couples out laser light of a different polarization (for example s-polarization) of the circulation device 10. When the polarization switch 16' is actuated, then the laser light will be coupled out of the circulation device 10 when subsequently reaching the out-coupling mechanism 16. It is not necessary to realize the polarization switch 16 as a separate component, and the polarization switch 16' can be realized as a component of the extraction mechanism 16. The polarization switch 16' acts together with the out-coupling mechanism 16 in such a way that laser light that is in the circulation device is coupled out of the circulation device 10 after having carried out a predetermined number of circulations.

The polarization switch 16' can be realized for example as a Pockels cell through which the laser beam coupled into the circulation device passes. A Pockels cell switches electronically and thus very fast.

With the optical circulation device 10 shown in FIG. 1, the position of an external laser beam S can be affected as follows: At the in-coupling mechanism 15, a laser beam S is coupled into the circulation device 10. The coupled-in laser beam circulates in the circulation device 10 as coupled-in laser beam $S_1$ in the first circulation (clockwise in the shown embodiment). In the first circulation, the laser beam $S_1$ passes inter alia the polarization switch 16'. Depending on how the polarization switch 16' is controlled, the laser beam 16' in the first circulation either maintains its polarization, or the polarization is changed. Depending on the polarization of the laser beam $S_1$ in the first circulation, the laser beam is either coupled out at the out-coupling mechanism 16, or is directed as laser beam $S_2$ into a second circulation around the circulation device 10.

Here, the position of propagation, that is, the beam position, of the laser beam $S_2$ in the second circulation is laterally offset with regard to the position of propagation of the laser beam $S_1$ in the first circulation at the latest when arriving at the first deflection device 11. This offset is caused by a misadjustment of the deflection devices 11, 12, 13, and 14 when compared with an exact quadrangle circulation adjustment. After each further circulation through the circulation device 10, the laser beam $S_{x+1}$ in the x+1-th circulation is laterally offset with respect to the laser beam $S_x$ in the previous x-th circulation. With this, the laser beam is laterally offset in the circulation device 10 depending on the number of circulations carried out.

During each single circulation, the coupled-in laser beam passes through the polarization switch 16', which is realized for example as a Pockels cell. The polarization of the coupled-in laser beam can therefore be switched in each single circulation. With this, it is possible to set an exactly predetermined number of circulations carried out in the circulation device 10, depending on the operating setting of the out-coupling mechanism 16 respectively the polarization switch 16'.

The circulation device 10 here is independent of the type of laser system used for generating the laser beam S' to be coupled in, and thus can be used with each (pulsed) laser. Therefore, any arbitrary laser source and laser process can be coupled into the circulation device 10. The circulation device 10 achieves an ultrafast beam splitting that can be used for example in industrial processes.

The laser beam can pass through the circulation device 10 so that its q parameter is reproduced at a specific position within the circulation device 10 after one or more circulations.

In one embodiment variant, the in-coupling mechanism may be omitted, as the beam position is geometrically separated from the other beam paths.

It is not necessary that the laser beams, as shown in FIG. 1, circulate in the optical circulation device absolutely in parallel and/or laterally offset to each other. For example, it is also possible that the laser beams differ from each other in their angle of radiation, which may be advantageous at narrow apertures, for example at the out-coupling mechanism, an optional amplification and/or weakening in the circulation device, as well as at linear and non-linear optical components.

If the out-coupling mechanism 16 comprises a Pockels cell, then the crystal thereof is preferably realized so large that, with a parallel offset of the laser beams, all laser beams up to a predetermined number of circulations are guided through the Pockels cell. This can be achieved particularly simple and cost effective with a lateral parallel offset of the laser beams, because the optical surfaces of the Pockels cell can be realized as elongated rectangles, with low requirements to the high voltage to be applied across the thin crystal of the Pockels cell.

The circulation device can be constructed in such a way that the laser beams in all circulations pass through the Pockels cell at the same lateral position with a small individual angular offset with respect to each other. In this way, it is possible to cost effectively realize a circuit having a relatively small Pockels cell or small AOM as an out-coupling mechanism.

Pockels cells and AOMs achieve very high repetition rates, so that fast circuits for circulation devices for high repetitive laser systems in the megahertz range can be realized.

A conventional (slow) beam positioning concept can be arranged subsequent to the circulation device 10, for example for a macro positioning of the laser beam.

It is not necessary here that the beam positions differ by a lateral parallel offset. Also other types of geometric differentiation can be achieved by the positioning and arrangement of the deflection devices 11, 12, 13, and 14, such as for example beam angle, different beam positions parallely offset on a circle path, as well as combinations of theses beam positions.

Inside and outside of the circulation device, the beam positions can be positioned other than in a line. For example, a circulation device may be provided for a helical drilling method, wherein laser beams, depending on the number of circulations carried out, are coupled out offset in rotation from each other on a circular path. Within the circulation device, by means of suitable optical systems, the beam positions can be brought in arbitrary forms on a workpiece, for example in case of helical drilling in a micro material processing in a circular form and/or in a form of a circle segment. Using a suitable circulation device, the beam angle of the coupled-out laser beam when rotating (for example for a helical drilling) can be changed rapidly.

The beam position of the different coupled-out laser beams can overlap in part. The optical assembly of the circulation device can be realized such that the q parameter of the laser beam at the exit, where the laser beam is coupled out, is the same for all number of beam circulations. Preferably, the circulation device is realized such that the q parameter is the same for all coupled-out laser beams.

The circulation device shown in FIG. 1 is of spiral shape and in form of a quadrangle. As an alternative, the circulation device can be realized in form of a triangle, or generally in polygon form, comprising a corresponding number of deflection devices. The circulation device can be realized with only two deflection devices, in which case the circulation device is realized substantially longitudinal and resembles a classic laser resonator having two deflection mirrors, between which the laser beam circulates. In such a longitudinal form, a beam positioning of the coupled-out laser beams depending on the number of circulations carried out in the circulation device can be achieved for example by arranging reflective surfaces of the two deflection devices not parallel to each other, but with a slight offset to each other.

As an optical component 17, or in addition to other components, a gain medium may be arranged in the circulation device that can compensate for losses in the circulations of the laser beam.

As an alternative to using a Pockels cell, coupling out can be performed mechanically. This is slower, but also cheaper as no expensive Pockels cell is needed. For this, for example a rotating mirror can be used as an out-coupling mechanism 16, as it is shown in FIGS. 2 and 3.

Figures 2, 3:
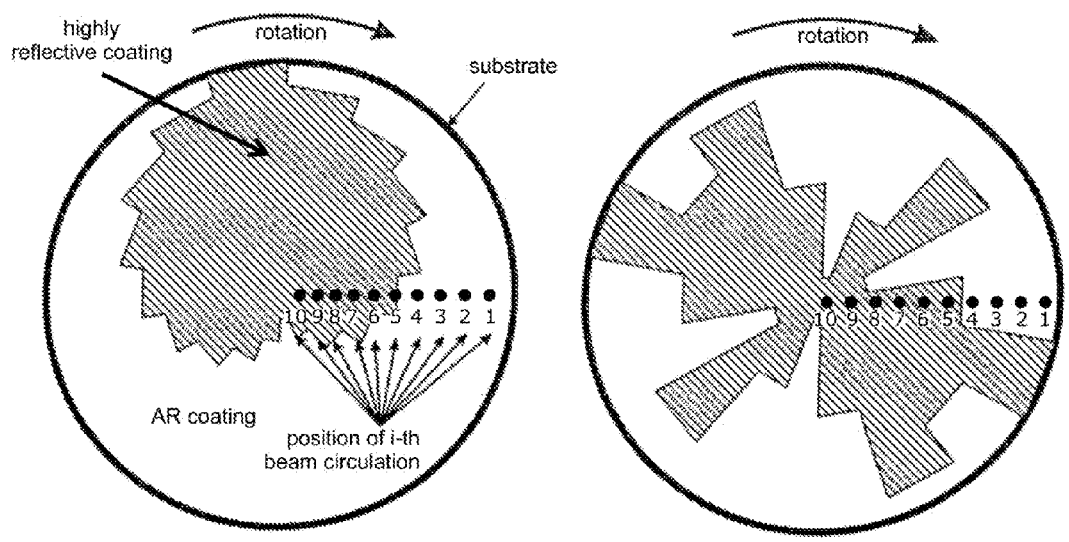
FIG. 2 is a schematic diagram of a rotating out-coupling switch element as an out-coupling mechanism for a circulation device.
FIG. 3 is a further schematic diagram of a rotating out-coupling switch element as an out-coupling mechanism for a circulation device.

FIGS. 2 and 3 respectively show schematically an embodiment of a rotating out-coupling mirror as an out-coupling mechanism 16. A conventional cylindrical mirror substrate may be provided as mirror substrate. A portion of the mirror surface has a highly reflective coating, while the remainder of the substrate is almost lossless transmissive for laser light. Beam positions for the first to tenth circulation of a leaser beam are arranged to extend from the outside to the center of rotation of the mirror. When the laser beam traverses a transmissive region of the substrate, shown as white in FIGS. 2 and 3, the laser beam remains in the circulation devices for at least one more circulation. When the laser beam traverses a reflective region, shown hatched in FIGS. 2 and 3, the laser beam is coupled out.

With the mirror position as shown in FIG. 2, a laser beam would be reflected at the $6^{th}$ circulation and thus would be coupled out. With the mirror position as shown in FIG. 3, a laser beam would be reflected at the $5^{th}$ circulation and thus would be coupled out.

The mirrors shown in FIGS. 2 and 3 are rotatable about their center of rotation so that depending on the mirror position a laser beam is extracted from the circulation device after a different number of circulations.

In case that higher rates of coupling out are desired, a second or third Pockels cell can be used in order to increase switching speed.

Moreover, further switches (such as for example one or more Pockels cells) can be arranged in the circulation device to reverse the direction of a lateral offset of the beam axis of the laser beam by 180°. In this way, a lateral offset by a predetermined distance in a first direction per circulation can be reversed in a lateral offset by a same predetermined distance in opposite direction per each successive circulation. In the i-th circulation after this beam reversal, the laser beam would thus have the same beam position as in the i-th circulation prior to the beam reversal. In this way it is possible to allow for further (different) numbers of circulations for coupling out same beam positions.

Moreover, switches (such as for example one or more Pockels cells) can be arranged in the circulation device for turning by 90° the direction in which a lateral offset of the beam axis takes place per circulation. In subsequent circulations after actuating the switch, thus, there results with each circulation a lateral offset of the beam axis in a direction rotated by 90°. Hereby it is possible to adjust the beam position, such as for example the beam angle, in two dimensions.

Moreover, it is possible to achieve a lateral offset of the laser beam in a second direction, whereby the number of obtainable beam positions when coupling out is quadrupled. For this, the circulation device can be supplemented by a second sub-circulation device whose beam axis path is offset by 90° with respect to the beam axis path of the first sub-circulation device. The circulation device thus comprises two sub-circulation devices. The beam axes in the two sub-circulation devices may be offset from one another at an angle other than 90°, making it possible to realize finely adjustable out-coupling patterns of the beam positions, similar to moiré patterns. The second sub-circulation device can be of a larger dimension so that the beam circulations in the two sub-circulation devices do not interact with each other. Alternatively, the sub-circulation devices can be arranged in series to successively adjust both dimensions of the beam position.

A workpiece can be arranged after the circulation device, onto which the coupled-out laser beam is projected. With successively coupled-out laser beams having different beam positions, a sort of print image can be created on the workpiece. This can be used for example for producing print cylinders, or for other applications in which a pattern is to be produced on a surface.

LIST OF REFERENCE NUMERALS 10 circulation device
11 deflection device
12 deflection device
13 deflection device
14 deflection device
15 in-coupling mechanism
16 out-coupling mechanism
16' polarization switch
17 optical component
S external laser beam
$S_1$ laser beam in first circulation
$S_2$ laser beam in second circulation
$S_3$ laser beam in third circulation
$S_4$ laser beam in fourth circulation
$S_n$ laser beam in n-th circulation

What is claimed:

1. An optical circulation device for coupling in a laser beam, comprising:
deflection devices between which the coupled-in laser beam carries out circulations in the optical circulation device, and
an out-coupling device configured for coupling out the laser beam after having carried out a predetermined number of circulations in the circulation device,
wherein the deflection devices are designed and arranged in such a way that the position of the laser beam when coupling out depends on the number of circulations carried out in the optical circulation device; wherein the deflection devices are designed and arranged in such a way that at least three different positions of the laser beam when coupling out depend on three different numbers of circulations carried out in the optical circulation device.

2. The optical circulation device according to claim 1, wherein the deflection devices are designed and arranged in such a way that a lateral offset of the position of the laser beam when coupling out depends on the number of circulations carried out in the optical circulation device.

3. The optical circulation device according to claim 2, wherein the deflection devices are designed and arranged in such a way that in two dimensions a lateral offset of the position of the laser beam when coupling out depends on the number of circulations carried out in the optical circulation device.

4. The optical circulation device according to claim 1, wherein the deflection devices are designed and arranged in such a way that a beam angle of the laser beam when coupling out depends on the number of circulations carried out in the optical circulation device.

5. The optical circulation device according claim 1, wherein the deflection devices are designed and arranged in such a way that a circular path offset of the laser beam when coupling out depends on the number of circulations carried out in the optical circulation device.

6. The optical circulation device according to claim 1, wherein the out-coupling device comprises a Pockels cell.

7. The optical circulation device according to claim 6, wherein the Pockels cell is arranged in such a way that each circulation of the laser beam in the circulation device passes through the Pockels cell.

8. The optical circulation device according to claim 1, wherein the deflection devices are designed and arranged in such a way that the circulation of the laser beam in the circulation device is carried out in a spiral shaped path.

9. A method of positioning a laser beam, comprising: coupling a laser beam into an optical circulation device,
carrying out a predetermined number of circulations of the laser beam in the optical circulation device, and coupling the laser beam out of the circulation device,
wherein the position of the laser beam when coupling out depends on the number of circulations carried out in the optical circulation device; wherein carrying out a predetermined number of circulations and coupling the laser beam out of the circulation device includes operating deflection devices, between which the coupled-in laser beam carries out circulations in the optical circulation device, such that at least three different positions of the laser beam when coupling out depend on three different numbers of circulations carried out in the optical circulation device.

10. The method of claim 9, wherein the deflection devices are arranged such that a lateral offset of the position of the laser beam when coupling out depends on the number of circulations carried out in the optical circulation device.

11. The method of claim 10, wherein the deflection devices are arranged such that in two dimensions a lateral offset of the position of the laser beam when coupling out depends on the number of circulations carried out in the optical circulation device.

12. The method of claim 9, wherein the deflection devices are arranged such that a beam angle of the laser beam when coupling out depends on the number of circulations carried out in the optical circulation device.

13. The method of claim 9, wherein the deflection devices are arranged such that a circular path offset of the laser beam when coupling out depends on the number of circulations carried out in the optical circulation device.

14. The method of claim 9, wherein coupling the laser beam out of the circulation device includes operating an out-coupling device comprising a Pockels cell.

15. The method of claim 14, wherein the Pockels cell is arranged such that each circulation of the laser beam in the circulation device passes through the Pockels cell.

16. The method of claim 9, wherein the deflection devices are arranged that circulation of the laser beam in the circulation device is carried out in a spiral shaped path.

* * * * *